(12) United States Patent
Liu et al.

(10) Patent No.: US 11,535,158 B2
(45) Date of Patent: Dec. 27, 2022

(54) VEHICULAR CAMERA WITH AUTOMATIC LENS DEFOGGING FEATURE

(71) Applicant: Magna Electronics Inc., Auburn Hills, MI (US)

(72) Inventors: Zhongyao Liu, Troy, MI (US); Yuesheng Lu, Farmington Hills, MI (US); Jonathan D. Conger, Berkley, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/830,517

(22) Filed: Mar. 26, 2020

(65) Prior Publication Data

US 2020/0307455 A1 Oct. 1, 2020

Related U.S. Application Data

(60) Provisional application No. 62/825,083, filed on Mar. 28, 2019.

(51) Int. Cl.
*H04N 5/225* (2006.01)
*B60R 1/06* (2006.01)

(52) U.S. Cl.
CPC ......... *B60R 1/0602* (2013.01); *H04N 5/2254* (2013.01); *H04N 5/22521* (2018.08)

(58) Field of Classification Search
CPC . H04N 5/22521; H04N 5/2254; B60R 1/0602
See application file for complete search history.

(56) References Cited

U.S. PATENT DOCUMENTS

| 5,550,677 | A | 8/1996 | Schofield et al. |
| 5,670,935 | A | 9/1997 | Schofield et al. |
| 5,786,772 | A | 7/1998 | Schofield et al. |
| 5,929,786 | A | 7/1999 | Schofield et al. |
| 5,949,331 | A | 9/1999 | Schofield et al. |
| 6,097,023 | A * | 8/2000 | Schofield ............. B60Q 1/1423 348/E7.086 |
| 6,636,258 | B2 | 10/2003 | Strumolo |
| 6,690,268 | B2 | 2/2004 | Schofield et al. |
| 6,717,610 | B1 | 4/2004 | Bos et al. |
| 6,757,109 | B2 | 6/2004 | Bos |
| 6,802,617 | B2 | 10/2004 | Schofield et al. |
| 6,806,452 | B2 | 10/2004 | Bos et al. |
| 6,822,563 | B2 | 11/2004 | Bos et al. |

(Continued)

*Primary Examiner* — Jonathan R Messmore
(74) *Attorney, Agent, or Firm* — Honigman LLP

(57) ABSTRACT

A vehicular vision system includes a camera having a housing and a lens barrel including a lens. The camera is configured to be disposed at an exterior portion of a vehicle so as to have a field of view exterior of the vehicle. An image processor is operable to process frames of image data captured by the camera. A heating device is disposed at or near the lens and is activated to initially heat the lens responsive to determination, via processing by the image processor of a frame of captured image data, of a threshold degree of lens occlusion at the lens. The heating device is (i) deactivated responsive to determination that the determined lens occlusion is not water or moisture, or (ii) further powered to increase the heating function responsive to determination that the determined occlusion is water or moisture.

19 Claims, 2 Drawing Sheets

(56) References Cited

U.S. PATENT DOCUMENTS

| | | |
|---|---|---|
| 6,882,287 B2 | 4/2005 | Schofield |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,965,336 B2 | 6/2011 | Bingle et al. |
| 8,694,224 B2 | 4/2014 | Chundrlik, Jr. et al. |
| 9,083,864 B2 | 7/2015 | Reed |
| 9,319,637 B2 | 4/2016 | Lu et al. |
| 9,961,241 B2 | 5/2018 | Biemer |
| 10,137,844 B2 | 11/2018 | Weinecke et al. |
| 2013/0103257 A1* | 4/2013 | Almedia ............... B60S 1/0844 701/36 |
| 2013/0331730 A1* | 12/2013 | Fenech ............... A61B 1/00091 600/560 |
| 2015/0321621 A1 | 11/2015 | Van Dan Elzen et al. |
| 2016/0264064 A1 | 9/2016 | Byrne et al. |
| 2016/0272163 A1 | 9/2016 | Dreiocker et al. |
| 2018/0129934 A1* | 5/2018 | Tao ..................... G06N 3/0454 |
| 2018/0132009 A1* | 5/2018 | Ivanovic ............... H04N 19/87 |
| 2018/0207691 A1 | 7/2018 | Byrne et al. |
| 2018/0210321 A1* | 7/2018 | Du ..................... G05B 19/042 |
| 2018/0246323 A1* | 8/2018 | Fedigan ............ G02B 27/0006 |
| 2019/0113743 A1 | 4/2019 | Kumar |
| 2020/0216033 A1* | 7/2020 | Herman ................ G06V 20/56 |
| 2020/0314311 A1 | 10/2020 | Liu et al. |

\* cited by examiner

VEHICULAR CAMERA WITH AUTOMATIC LENS DEFOGGING FEATURE

CROSS REFERENCE TO RELATED APPLICATION

The present application claims the filing benefits of U.S. provisional application Ser. No. 62/825,083, filed Mar. 28, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. For some applications, a lens heating function may be included within some cameras to defog the lens elements.

SUMMARY OF THE INVENTION

The present invention provides a vision system or imaging system or driving assist system or parking assist system for a vehicle that utilizes one or more cameras to capture image data representative of images exterior of the vehicle, and provides a heating element or function to heat the lens of the camera. The heating function or system initially heats the lens responsive to detection of lens occlusion or obstruction, such as dirt or water at the lens, and that either (i) deactivates the heating function responsive to determination that the detected occlusion is not water or moisture or (ii) increases the heating function responsive to determination that the detected occlusion is water or moisture. The camera may be mounted or disposed at an exterior structure of the vehicle, such as, for example, a vehicle panel, grill, bumper, fascia, light bar, center high mounted stop lamp (CHMSL) or the like, with its lens present at the exterior structure and viewing exterior of the vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
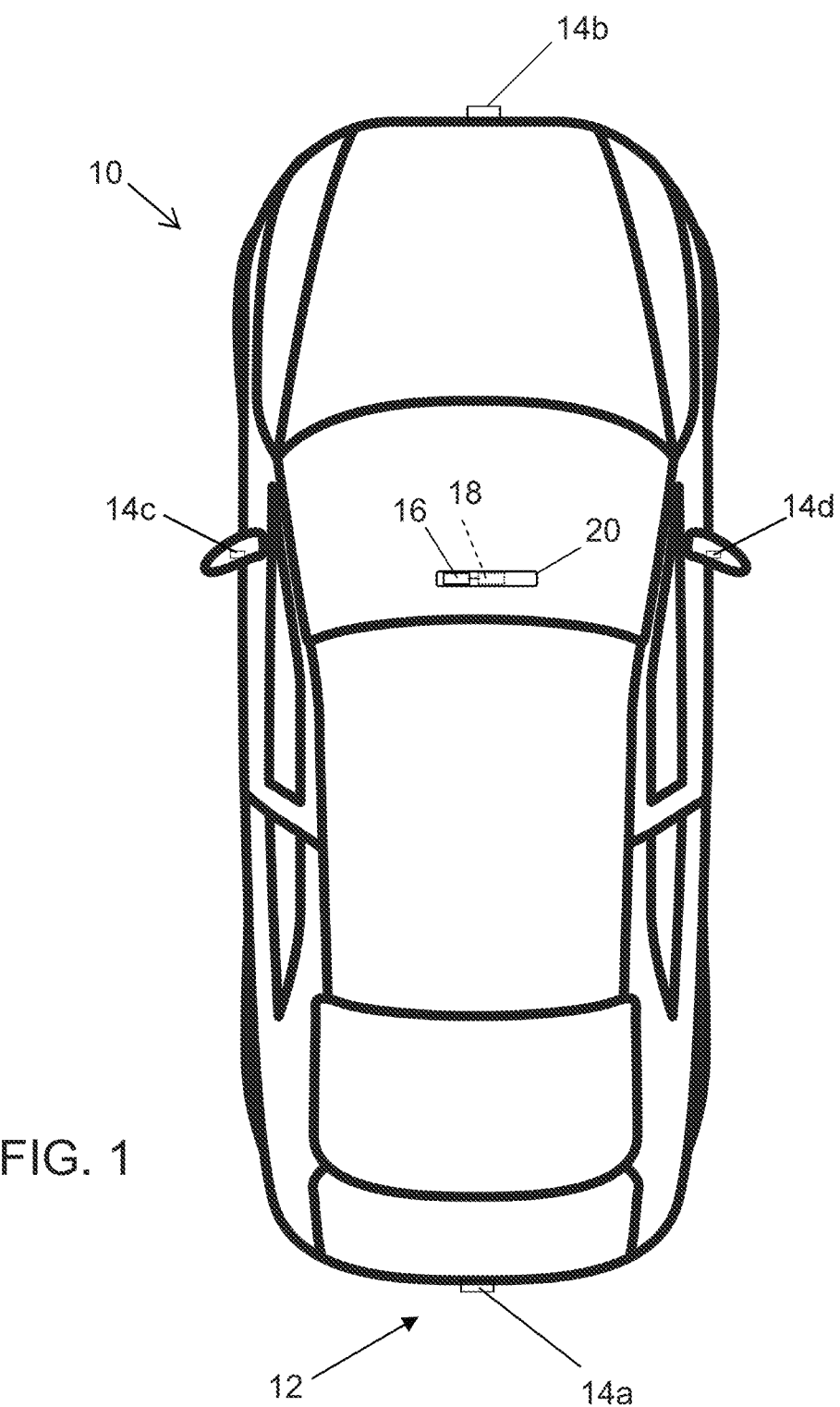
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The cameras each include a housing and imager and a lens that is oriented such that the camera views exterior of the vehicle. Because the camera is disposed at the vehicle exterior, such cameras are exposed to cold temperatures and temperature and humidity fluctuations, whereby moisture and/or ice or snow may form or collect at the lens. Such automotive camera lenses are also susceptible to dirt or debris collecting at the lens of the camera. This is particularly an issue for cameras mounted at the front of a vehicle, such as at a front bumper or grill or fascia of the vehicle, or at the rear of the vehicle.

Figure 2:
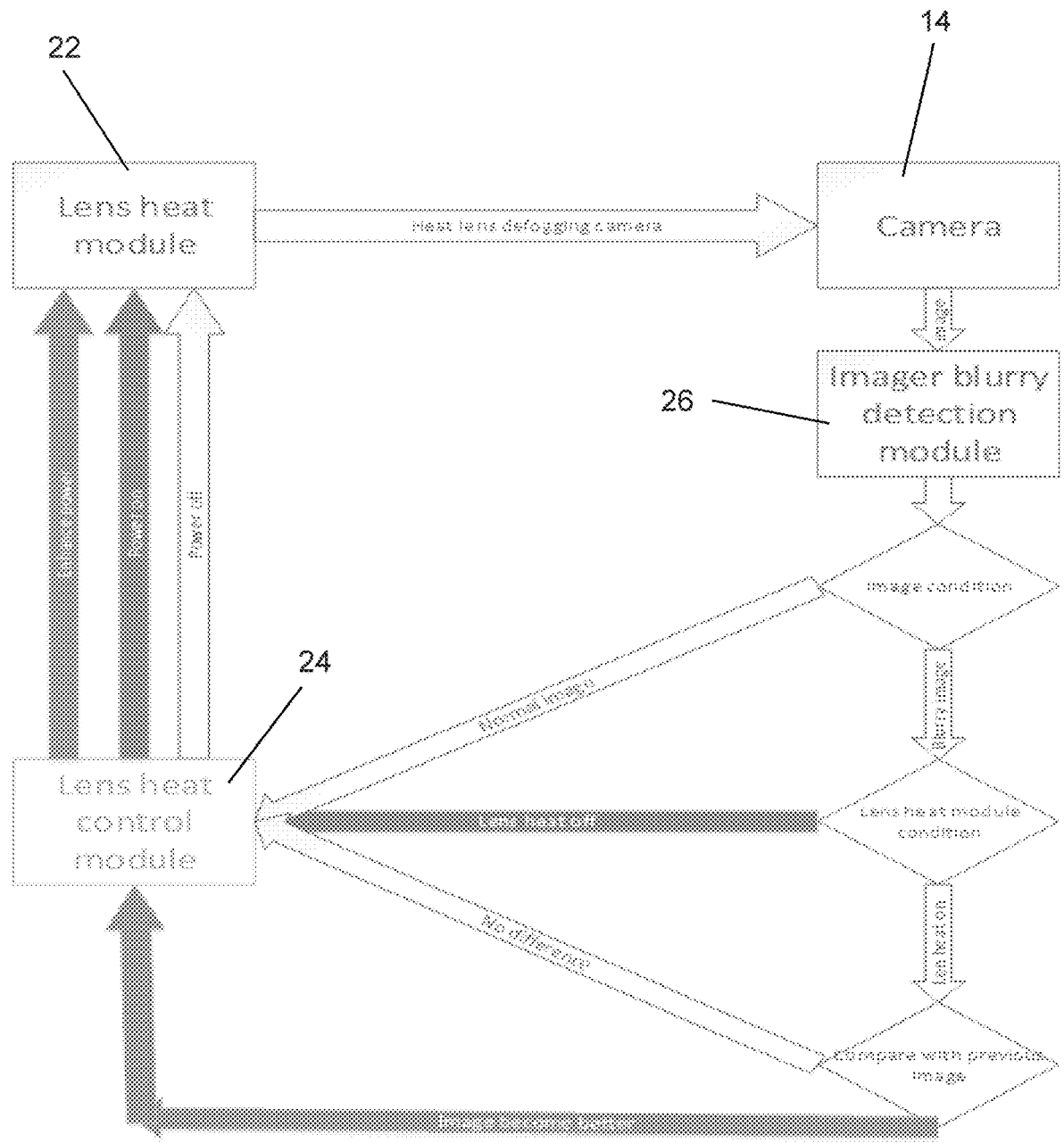
FIG. 2 is a block diagram showing the lens defogging system in accordance with the present invention.

Condensation at the lens surface of the camera will reduce camera image quality and thus may be a high risk for advanced driving assist systems or autonomous vehicle control systems or the like. The camera 14 has its lens heated by a heating device (such as a heating element or device that heats at least a portion of the outermost lens element of the camera). For example, and such as shown in FIG. 2, the camera or system may include a lens heating module or device 22 (that may be at or part of the lens), a lens heat control module or device or system 24, and an image blurring or occlusion detection module or device or system 26.

The camera captures image data and the vision system (via a data processor or image processor) processes the captured image data and applies an image blur or occlusion detection mode or algorithm to check frames of captured image data to determine if there is blurring or occlusion present in the captured image data (such as by detecting something that does not move relative to the camera when other objects or elements in the field of view of the camera are moving relative to the camera). Responsive to determination of a blurred or occluded image, the system sends a command to the lens heat control module to activate or power on the lens heating module or device. If, after initially powering on the lens heating module, the image gets better (becomes less blurry or less occluded), then the system enhances or increases the power to the lens heating module to enhance or speed up the defogging process. If the image does not change after initially powering on the lens heating module, then the system determines that the detected blurriness or occlusion is not due to water or moisture or condensation at the lens, so the system powers down or turns off the lens heating module.

The determination of whether to deactivate the heating device or to further power the heating device is based on whether or not the level or degree of lens occlusion reduces by a threshold amount over a plurality of frames of image data captured by the camera. For example, the system may initially determine lens occlusion that is sufficient (or above an activation threshold) so that the system activates the heating device. After and while the heating device is activated or powered, the system monitors the lens occlusion and if, over a threshold number of frames of captured image data (e.g., over five frames or ten frames or the like), the system determines that the lens occlusion has not reduced by a second or deactivation threshold (as compared to the initial or first frame of captured image data), then the system determines that the lens occlusion is not likely due to water or precipitation or moisture at the camera lens and deactivates the heater. Also, after and while the heating device is activated or powered, and as the system monitors the lens occlusion, if, over a threshold number of frames of captured image data (e.g., over five frames or ten frames or the like), the system determines that the lens occlusion has reduced by at least the second or deactivation threshold (as compared to the initial or first frame of captured image data), then the system determines that the lens occlusion is likely due to water or precipitation or moisture at the camera lens and further powers the heater to enhance heating and evaporation of the water or precipitation or moisture at the camera lens.

The system may determine that the lens is occluded when the system determines that a threshold surface area of the lens (corresponding to a threshold number of photosensors at the imager that are imaging that region) is occluded (such as, for example, when 10 percent of the lens is occluded). After the heating device is activated, the system monitors the lens occlusion to determine if the level or degree of lens occlusion reduces by a threshold amount (such as, for example, when the amount of lens occlusion decreases by 10 percent or by 20 percent (or any other preselected degree) over a selected or predetermined number of frames of captured image data), and then either deactivates the heating device of further powers the heating device. If the heating device is further powered (because the system determined that the lens occlusion was decreasing), the system continues to monitor the lens occlusion and deactivates the heating device when the lens occlusion reduces to a third threshold level (such as when the lens occlusion drops by, for example, at least 75 percent or at least 80 percent or at least 90 percent from its initial level). After the heating device is deactivated (either responsive to the system determining that the lens occlusion is water or precipitation or moisture and after the lens occlusion has decreased to the third or deactivation threshold or responsive to the system determining that the lens occlusion is not water or precipitation or moisture), the system continues to monitor the lens occlusion to determine if the degree of lens occlusion again increases to the activation threshold or if the degree of lens occlusion (already determined to initially not be due to water or precipitation or moisture) further increases another threshold amount so that the further occlusion may be due to water or precipitation or moisture.

For the auto defogging camera, the lens heat control module and the blurred or occluded image detection module may not be physically inside or part of the camera. The modules can be outside of the camera (such as at the ECU of the vehicle) and may send or communicate the signal or command or power to the lens heating module via a wire harness or cables or communication network or bus of the vehicle. Optionally, for example, the blurred or occluded image detection module may comprise part of the image signal processor (ISP) or ECU function.

Thus, and such as shown in FIG. 2, the camera 14 captures frames of image data (such as while the vehicle is moving or parked) and the captured image data is processed by the imager blurry detection module or blurred image or lens occlusion detection module 26. If, via processing of captured image data, the system determines that the lens is not occluded (i.e., the image data is not blurred or is representative of a normal image), the system communicates to the lens heating control module 24 so that control module 24 deactivates (if already on) or maintains off the lens heating module 22, whereby the camera continues to capture image data and the process repeats.

If, via processing of captured image data, the system determines that the lens is occluded (i.e., the image data is blurred or is representative of a "non-normal" image) when the lens heating module is off, the system communicates to the lens heating control module 24 so that control module 24 powers on the lens heating module 22, whereby the lens heating module generates heat at the lens of the camera 14 (such as at an initial or low power or reduced power level or setting). The camera then continues to capture image data and the process repeats.

If, via processing of captured image data, and with the heating module in its initial activation state, the system determines that the lens is occluded (i.e., the image data is blurred or is representative of a non-normal image), the system compares the current frame of captured image data to a previous frame of captured image data to determine if there is a change in the level of occlusion at the lens. If there is no difference determined, then the system determines that the detected occlusion is not due to condensation at the lens and communicates to the lens heating control module 24 so that control module 24 powers off or deactivates the lens heating module.

If, however, the system determines that there is a difference between the current frame of captured image data and the previous frame of captured image data, with the current frame of captured image data being clearer than the previous frame of captured image data, the system determines that the occlusion is due to moisture or condensation at the lens and communicates to the lens heating control module 24 so that the control module 24 increases or enhances the power supplied to the lens heating module 22 to increase or enhance heating of the lens to more rapidly evaporate the moisture or condensation present at the lens of the camera 14.

Thus, the present invention provides a heating system (and optionally a washer system too) that heats the lens responsive to detection of lens occlusion or dirt or water at the lens and that either deactivates the heating function responsive to determination that the detected occlusion is not water or moisture or increases the heating function responsive to determination that the detected occlusion is water or moisture. Thus, if the system determines occlusion at the lens that is not representative of or indicative of moisture or condensation, the system does not keep heating the lens when it is not necessary. However, if the system determines that occlusion at the lens is representative of or indicative of moisture or condensation at the lens, the system increases the level of heating at the lens to more rapidly evaporate the moisture or condensation present at the lens of the camera.

The lens heating module or device may comprise any suitable heating device or element or module. For example, the heating module or device may utilize aspects of the lens heating device or system described in U.S. provisional application Ser. No. 62/825,128, filed Mar. 28, 2019, which is hereby incorporated herein by reference in its entirety.

The camera may optionally also include a fluid spraying device that connects to a pressurized fluid supply and has a fluid passageway and nozzle so as to spray fluid onto the lens to clean the lens of dirt or debris. The spraying or cleaning device may operate with or separate from the heating device. Optionally, the spraying or cleaning device may be activated responsive to determination that the detected occlusion is not moisture or condensation at the lens (and such as when the heating device is turned off).

The heating elements or circuits could be directly attached to a vehicle harness or be integrated into a camera pigtail if included in the design. Activation and control of the heating element may be via messages from the camera to the vehicle's communications network. Control could also be included in this device by way of integrated temperature sensor and timer. For example, a temperature sensor may be included at the camera or heater element such that, when the sensed temperature drops below a threshold temperature, the heating device is automatically activated to heat the lens barrel to limit or preclude moisture or ice forming on the lens optics.

The camera and/or system may utilize aspects of the cameras/systems described in U.S. Pat. Nos. 10,137,844; 9,961,241 and/or 9,319,637, and/or U.S. Publication Nos. US-2019-0113743; US-2018-0207691; US-2016-0272163; US-2015-0321621 and/or US-2016-0264064, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ™ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system comprising:
a camera comprising a housing and a lens barrel including a lens, wherein the lens barrel is attached at the housing so that the lens is optically aligned with an imager disposed in the camera housing;
wherein the camera is configured to be disposed at an exterior portion of a vehicle so as to have a field of view exterior of the vehicle;
a heating device disposed at the lens;
an image processor operable to process frames of image data captured by the camera;
wherein the heating device is activated to initially heat the lens responsive to determination, via processing by the image processor of a first frame of captured image data, of lens occlusion at the lens;
wherein the heating device is (i) deactivated responsive to determination, via processing by the image processor of multiple frames of image data captured by the camera subsequent to the first frame of captured image data, that the determined lens occlusion is not water or moisture, or (ii) further powered to increase the heating function responsive to determination, via processing by the image processor of multiple frames of image data captured by the camera subsequent to the first frame of captured image data, that the determined lens occlusion is water or moisture; and
wherein the vehicular vision system determines whether or not the determined lens occlusion is water or moisture by comparing a current frame of captured image data to a previous frame of captured image data to determine whether or not there is a change in lens occlusion between capture of the previous frame of captured image data and the current frame of captured image data while the heating device is activated.

2. The vehicular vision system of claim 1, wherein the camera is configured to be fixedly mounted at the exterior portion of the vehicle.

3. The vehicular vision system of claim 2, wherein, with the camera fixedly mounted at the exterior portion of the vehicle, the lens is exposed at the exterior portion of the vehicle.

4. The vehicular vision system of claim 1, wherein the heating device includes an electrical lead that is configured to electrically connect to an electrical connector of the vehicle when the camera is disposed at the exterior portion of the vehicle.

5. The vehicular vision system of claim 1, wherein the vehicular vision system compares the current frame of captured image data to the previous frame of captured image data responsive at least in part to determining, via processing of the previous frame of captured image data, that there is lens occlusion at the lens.

6. The vehicular vision system of claim 1, wherein the vehicular vision system determines that the determined lens occlusion is water or moisture and further powers the heating device responsive to determination, via comparing the current frame of captured image data to the previous frame of captured image data, that a degree of lens occlusion is reduced in the current frame of captured image data as compared to the previous frame of captured image data.

7. The vehicular vision system of claim 1, wherein the vehicular vision system determines that the determined lens occlusion is not water or moisture and deactivates the heating device responsive to determination, via comparing the current frame of captured image data to the previous frame of captured image data, that a degree of lens occlusion does not change between the previous frame of captured image data and the current frame of captured image data.

8. A vehicular vision system comprising:
a camera comprising a housing and a lens barrel including a lens, wherein the lens barrel is attached at the housing so that the lens is optically aligned with an imager disposed in the camera housing;
wherein the camera is configured to be disposed at an exterior portion of a vehicle so as to have a field of view exterior of the vehicle;
a heating device disposed at the lens;
an image processor operable to process frames of image data captured by the camera;
wherein the heating device is activated to initially heat the lens responsive to determination, via processing by the image processor of a first frame of captured image data, of lens occlusion at the lens;
wherein the heating device is (i) deactivated responsive to determination, via processing by the image processor of multiple frames of image data captured by the camera subsequent to the first frame of captured image data, that the determined lens occlusion is not water or moisture, or (ii) further powered to increase the heating function responsive to determination, via processing by the image processor of multiple frames of image data captured by the camera subsequent to the first frame of captured image data, that the determined lens occlusion is water or moisture; and
wherein the vehicular vision system determines that the determined lens occlusion is not water or moisture responsive to determination, via comparing at least one of the subsequent frames of captured image data to the first frame of captured image data, that a degree of lens occlusion does not change between the at least one subsequent frame of captured image data and the first frame of captured image data.

9. The vehicular vision system of claim 8, wherein the vehicular vision system determines that the determined lens occlusion is not water or moisture responsive to determination that the degree of lens occlusion does not change by a threshold amount between the at least one subsequent frame of captured image data and the first frame of captured image data.

10. A vehicular vision system comprising:
a camera comprising a housing and a lens barrel including a lens, wherein the lens barrel is attached at the housing so that the lens is optically aligned with an imager disposed in the camera housing;
wherein the camera is configured to be disposed at an exterior portion of a vehicle so as to have a field of view exterior of the vehicle;
a heating device disposed at the lens;
an image processor operable to process frames of image data captured by the camera;
wherein the heating device is activated to initially heat the lens responsive to determination, via processing by the image processor of a first frame of captured image data, of lens occlusion at the lens;
wherein the heating device is (i) deactivated responsive to determination, via processing by the image processor of multiple frames of image data captured by the camera subsequent to the first frame of captured image data, that the determined lens occlusion is not water or moisture, or (ii) further powered to increase the heating function responsive to determination, via processing by the image processor of multiple frames of image data captured by the camera subsequent to the first frame of captured image data, that the determined lens occlusion is water or moisture; and
wherein the vehicular vision system determines that the determined lens occlusion is water or moisture responsive to determination, via comparing at least one of the subsequent frames of captured image data to the first frame of captured image data, that a degree of lens occlusion reduces from the first frame of captured image data to the at least one subsequent frame of captured image data.

11. The vehicular vision system of claim 10, wherein the vehicular vision system determines that the determined lens occlusion is water or moisture responsive to determination that the degree of lens occlusion reduces by a threshold amount between the at least one subsequent frame of captured image data and the first frame of captured image data.

12. A vehicular vision system comprising:
a camera comprising a housing and a lens barrel including a lens, wherein the lens barrel is attached at the housing so that the lens is optically aligned with an imager disposed in the camera housing;
wherein the camera is configured to be disposed at an exterior portion of a vehicle so as to have a field of view exterior of the vehicle;
a heating device disposed at the lens;
an image processor operable to process frames of image data captured by the camera;
wherein the image processor processes frames of captured image data to determine a degree of lens occlusion at the lens;
wherein the heating device is activated to initially heat the lens responsive to determination, via processing by the image processor of a first frame of captured image data, of an activation threshold degree of lens occlusion at the lens;
wherein, with the heating device activated, the camera captures multiple frames of image data captured by the camera subsequent to the first frame of captured image data and the image processor compares the subsequent frames of image data captured by the camera to the first frame of captured image data to determine change in the degree of lens occlusion at the lens while the heating device is activated;
wherein the heating device is further powered to increase the heating function responsive to determination that the degree of lens occlusion reduces at least a threshold amount from the first frame of captured image data to at least one of the subsequent frames of captured image data; and wherein the heating device is deactivated responsive to determination that the degree of lens occlusion does not reduce the threshold amount from the first frame of captured image data to at least one of the subsequent frames of captured image data.

13. The vehicular vision system of claim 12, wherein, with the camera disposed at the exterior portion of the vehicle, the lens is exposed at the exterior portion of the vehicle.

14. The vehicular vision system of claim 12, wherein the heating device includes an electrical lead that is configured to electrically connect to an electrical connector of the vehicle when the camera is disposed at the exterior portion of the vehicle.

15. The vehicular vision system of claim 12, wherein the vehicular vision system determines change in the degree of lens occlusion via comparing at least five subsequent frames of captured image data to the first frame of captured image data.

16. The vehicular vision system of claim 12, wherein, after the heating device has been further powered, the vehicular vision system deactivates the heating device responsive to determining that the degree of lens occlusion reduces to a deactivation threshold degree of lens occlusion.

17. A method of heating a lens of a vehicular camera to reduce lens occlusion due to water or moisture, the method comprising:

providing a camera comprising a housing and a lens barrel including a lens, wherein the lens barrel is attached at the housing so that the lens is optically aligned with an imager disposed in the camera housing, wherein the camera is configured to be disposed at an exterior portion of a vehicle so as to have a field of view exterior of the vehicle;

disposing a heating device at the lens;

processing, via an image processor, image data captured the camera to determine a degree of lens occlusion at the lens;

activating the heating device to initially heat the lens responsive to determining, via processing by the image processor of a first frame of captured image data, an activation threshold degree of lens occlusion at the lens;

with the heating device activated, capturing multiple frames of image data via the camera subsequent to the first frame of captured image data and comparing via the image processor the subsequent frames of image data captured by the camera to the first frame of captured image data to determine change in the degree of lens occlusion at the lens while the heating device is activated;

further powering the heating device to increase the heating function responsive to determining that the degree of lens occlusion reduces at least a threshold amount from the first frame of captured image data to at least one of the subsequent frames of captured image data; and deactivating the heating device responsive to determining that the degree of lens occlusion does not reduce the threshold amount from the first frame of captured image data to at least one of the subsequent frames of captured image data.

18. The method of claim 17, wherein comparing via the image processor the subsequent frames of image data captured by the camera to the first frame of captured image data comprises comparing at least five subsequent frames of captured image data to the first frame of captured image data.

19. The method of claim 17, comprising, after the heating device has been further powered, deactivating the heating device responsive to determining that the degree of lens occlusion reduces to a deactivation threshold degree of lens occlusion at the lens.

* * * * *